R. McMULLAN.
WINDMILL.
APPLICATION FILED SEPT. 18, 1913.
1,157,563.
Patented Oct. 19, 1915.
2 SHEETS—SHEET 2.
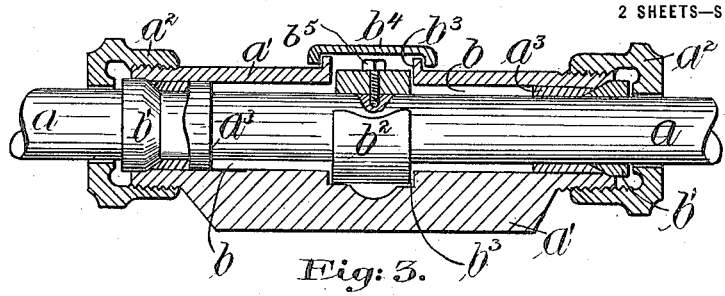
Fig: 3.
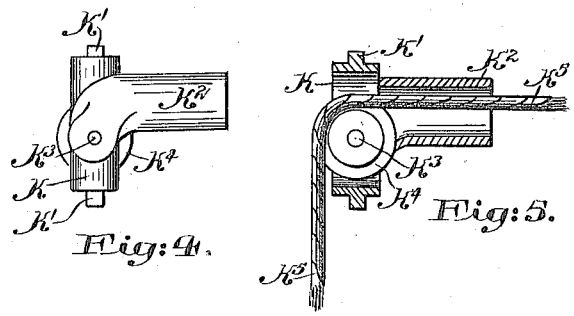
Fig: 4.   Fig: 5.
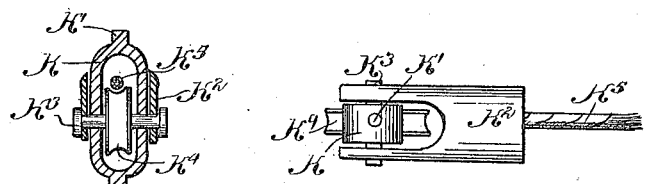
Fig: 6.   Fig: 7.
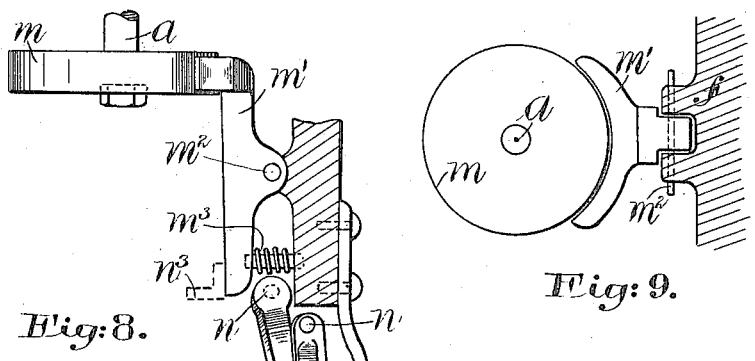
Fig: 8.   Fig: 9.
Witnesses:
M. E. McDade
C. J. Kesler
Inventor
Robert McMullan
by
James L. Norris

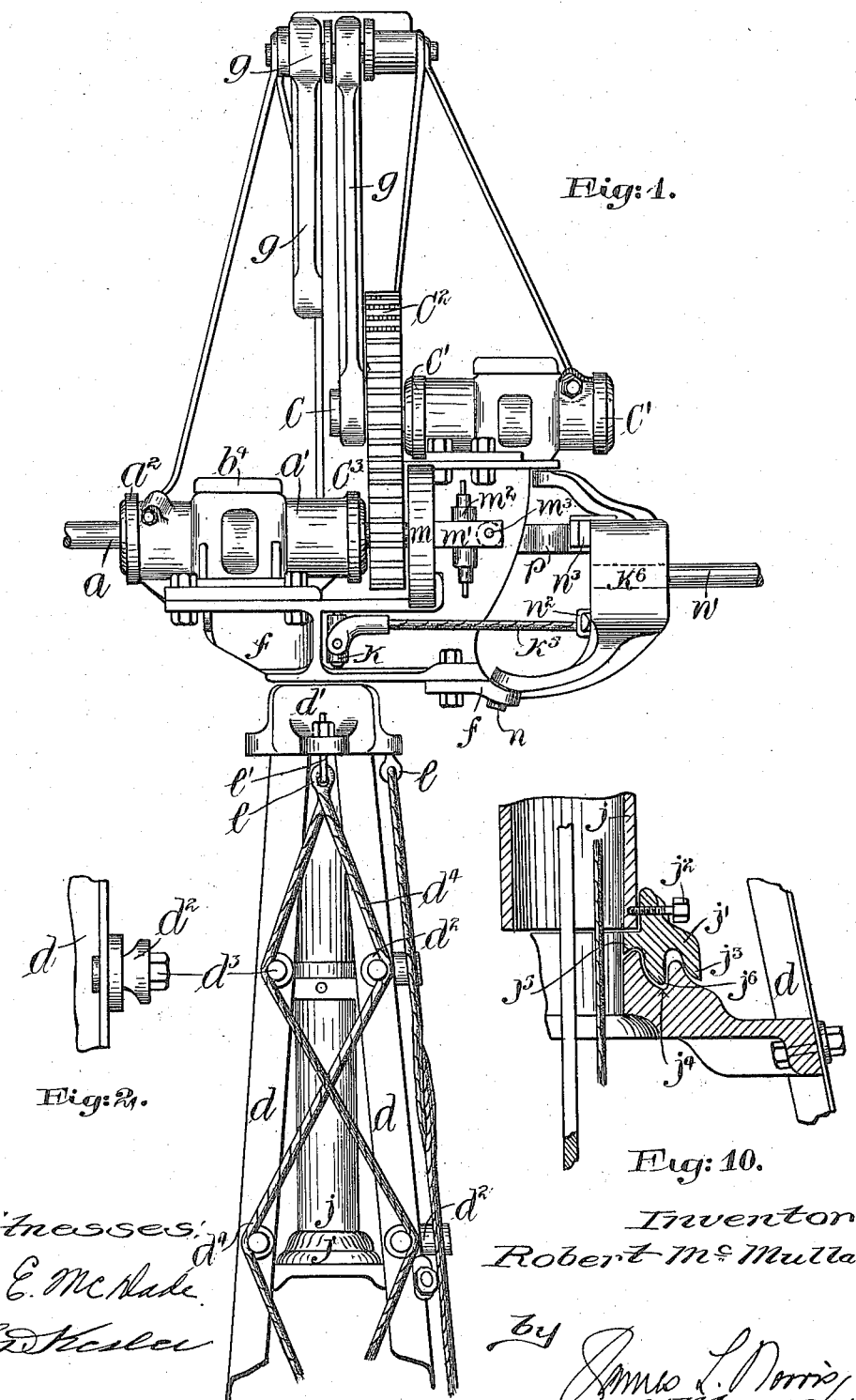

UNITED STATES PATENT OFFICE.

ROBERT McMULLAN, OF FREMANTLE, WESTERN AUSTRALIA, AUSTRALIA.

WINDMILL.

1,157,563.  Specification of Letters Patent.  Patented Oct. 19, 1915.

Application filed September 18, 1913. Serial No. 790,522.

*To all whom it may concern:*

Be it known that I, ROBERT MCMULLAN, a subject of the King of Great Britain, and residing at 99 South Terrace, Fremantle, Western Australia, Commonwealth of Australia, have invented certain new and useful Improvements in Windmills, of which the following is a specification.

This invention relates to an improved windmill comprising novel features whose general construction and assemblage of parts and members will be explained with the aid of the attached drawings in which—

Figure 1 is a front elevation and showing the mill as mounted on its tower the sails not being shown. Fig. 2 is a detail view of the roller for the tower tensional ropes. Fig. 3 is a longitudinal vertical section of the main shaft hub and particularly showing the lubricating bearing for the main shaft. Figs. 4 to 7 show the universal swivel bracket for carrying the pull rope for throwing the mill out of action by the operation of the rudder. Fig. 8 is a plan of the brake gear operated by the rudder and Fig. 9 is an end view of same. Fig. 10 is a broken away sectional view of the turn table for the mast head of the mill.

Referring particularly to Figs. 1 and 3 of said drawings $a$ is the main shaft of the mill held in the hub $a^1$ said hub being closed at each end by the screw caps $a^2$ and through which the shaft $a$ suitably protrudes or projects. This hub $a^1$ is bored to a diameter larger than that of the shaft while at both ends the actual bearing surfaces $a^3$ are made of soft metal such as babbitt. The annular chamber or space $b$ existing between the bearing surfaces $a^3$ acts as an oil well for the effective and continuous lubrication of the mill shaft $a$. The hub at its outer ends is countersunk or beveled so as to therein receive cork washers $b^1$ and which are pressed tight home by the screw caps $a^2$ as seen clearly in Fig. 3. These cork washers act as seals against the escape of oil from the well $b$.

The shaft $a$ is formed with a central thrust bearing $b^2$ so as to retain the shaft in true longitudinal position within the hub $a^1$. This hub is made with the gap $b^3$ and which is closed by the cap $b^4$ to maintain the bearing dust proof. This thrust bearing is keyed by a stud pin $b^5$ and operatively held by the gap $b^3$ as seen in Fig. 3. The spur gear shaft $c$ see Fig. 1 is likewise equipped as the shaft $a$ with end caps $c^1$ and cork seal washers as $b^1$ and oil well as $b$ and thrust bearing as $b^2$. The spur wheel $c^2$ is keyed on its shaft $c$ and intergears with the pinion wheel $c^3$ on the shaft $a$.

The stand or tower $d$ is made of angle section bars to form the legs which at their topmost fit into a cast head piece $d^1$. On these legs $d$ are mounted the rollers $d^2$ and held on their screw bolt pivots $d^3$ and around same are passed the wire tension ropes $d^4$ and arranged to form a network or criss-cross or lazytongs design as seen in Fig. 1. The ground terminals of these ropes are anchored to the base of the tower and each rope is brought over the rollers as shown and at their top joined in a thimble $e$ and held by the eye bolt $e^1$ secured to the tower head $d^1$. The rollers $d^2$ have one flange see Fig. 2 in order to allow of a tight grip or bite for the rope against the legs $d$ when the rollers are screwed home on their pivots pins $d^3$. On the tower head is surmounted the mill head casting as $f$ and as seen in Fig. 1 and said head casting $f$ is so arranged and "trimmed" as to effect a balance or equipoise for the operative gear and for the mill as a whole.

The mill is provided with the usual pitman gear suitably stayed and as marked $g$ but said gear forms no part of this invention.

At an approved position on the tower $d$ but preferably about two feet below the head $d^1$ is secured the foot bearing and turntable see Figs. 1 and 10. The construction is as follows:—To the base of the mast or pillar $j$ is secured the turntable $j^1$ by the stud bolts $j^2$ and said table is made integrally with its overhang or hood $j^3$ in order to protect the runner groove $j^4$ from dust and rain while the lip $j^5$ acts as a diverter for any rain which may enter at such inside point, the turn table being formed with a corresponding shaped formation as $j^6$ to neatly fit into and engage with the runner groove $j^4$ of the base $j^7$.

The mill is provided with novel means for bringing it up to the wind when it is desired to throw it out of action. Said means see Figs. 1 and 4 to 7 consist of a swivel bracket $k$ having a universal action. This bracket by its member $k$ is carried by the vertical pivots $k^1$ on the mill casting $f$ while its other tubular and jawed member $k^2$ makes radial movement on its pivot $k^3$ which acts as the center pin for the roller $k^4$. Around said roller passes the rope $k^5$ whose upper terminal is secured to the throat $k^6$ of the rudder or said rope end may be made fast to the rudder at any other approved point. This swivel bracket $k$ allows the rope $k^5$ to adapt or accommodate itself to the radial movement of the rudder and gives ease of working thereto. This rope passes down through the mill head $d^1$ and thence down the tubular pillar $j$ and finally made fast to the usual winding drum, mounted near the base of the mill tower. The brake gear see Figs. 1-8 and 9 comprises a brake wheel $m$ keyed on the end of the main shaft $a$. Said wheel makes frictional contact with a curved block $m^1$ said block being pivoted at $m^2$ to the mill casting. This block $m^1$ has a tensional spring $m^3$ so as to relieve or free said block from the wheel rim $m$. To the mill casting by the trunnions $n$ see Fig. 1 is hinged the throat piece $k^6$ which by the shaft $n^1$ carries the rudder or tail not shown. These trunnions $n$ are set or dished at such an angle and manner as to urge the rudder to swing to the position for bringing the mill up to the wind. This brake or lock $m^1$ is operated by the rudder thus:—By pulling on the rope $k^5$ to disengage the mill said rudder is brought hard around so as to render the wind inoperative as regards the mill. The throat $k^6$ carries an outstanding arm $n^2$ to which the upper terminal of the rope is attached as seen in Fig. 1. The throat also has a lug $n^3$ thereon and upon the radial swing of the rudder on its trunnions $n$ said lug $n^3$ makes pressing contact with the brake block $m^1$ and thereby causing latter to make frictional contact against the rim of the wheel $m$ and thereby arrest and lock the mill from any further movement until released in the usual manner by pull rope or lever. The mill casting also carries a spring $p$ whose function and duty is to cushion or absorb any jar or shock of the rudder when latter swings by gravity into the position for the working of the mill.

What I claim as my invention and desire to secure by Letters Patent is:—

The combination in a windmill, of a tubular mast, an operating rope extending upwardly therethrough, a hollow swivel bracket having a roller therein and comprising an outwardly projecting tubular jaw member, the operating rope extending through the bracket in engagement with the roller and also projecting through the jaw member, a swiveled rudder support having a throat to which the operating rope is terminally attached and also carrying a rudder shaft, the said throat being provided with a lug, a main shaft having wheel operating means associated therewith and a brake wheel secured on the end thereof, and a pivoted block arranged to have frictional contact with the brake wheel and provided with a release spring, said block being engaged by the lug on said throat when the rudder support radially swings to cause contact of the block and lug and thereby arrest and lock the mill against movement until released.

In testimony whereof I have hereunto set my hand in presence of two subscribing witnesses.

ROBERT McMULLAN.

Witnesses:
 RICHARD SPARROW,
 FREDERICK CHARLES WALTHAM.

Copies of this patent may be obtained for five cents each, by addressing the "Commissioner of Patents, Washington, D. C."